US 8,300,261 B2

(12) United States Patent
Johnson, II et al.

(10) Patent No.: US 8,300,261 B2
(45) Date of Patent: Oct. 30, 2012

(54) SYSTEMS AND METHODS FOR RETRIEVING PRINTABLE MEDIA TEMPLATES

(75) Inventors: James D. Johnson, II, Orange, CA (US); Jerry G. Hodsdon, Forestdale, MA (US); Wade Person, Huntington Beach, CA (US)

(73) Assignee: Avery Dennison Corporation, Pasadena, CA (US)

( * ) Notice: Subject to any disclaimer, the term of this patent is extended or adjusted under 35 U.S.C. 154(b) by 1397 days.

(21) Appl. No.: 11/361,351

(22) Filed: Feb. 24, 2006

(65) Prior Publication Data
US 2007/0201093 A1 Aug. 30, 2007

(51) Int. Cl.
*G06K 15/00* (2006.01)
*G06K 9/20* (2006.01)

(52) U.S. Cl. ....... 358/1.18; 715/226; 382/209; 382/317; 283/70; 707/705

(58) Field of Classification Search .................. 358/300, 358/1.18, 1.15; 235/462; 283/74, 70; 399/84; 347/104; 382/209, 317; 715/226; 707/705
See application file for complete search history.

(56) References Cited

U.S. PATENT DOCUMENTS

| | | | |
|---|---|---|---|
| 4,739,328 A | 4/1988 | Koelle et al. | |
| 4,830,186 A * | 5/1989 | George et al. | 206/449 |
| 5,621,864 A | 4/1997 | Benade et al. | |
| 5,859,779 A * | 1/1999 | Giordano et al. | 700/231 |
| 6,154,738 A | 11/2000 | Call | |
| 6,234,389 B1 * | 5/2001 | Valliani et al. | 235/380 |
| 6,426,806 B2 * | 7/2002 | Melen | 358/468 |
| 6,429,776 B1 | 8/2002 | Alicot et al. | |
| 6,491,217 B2 * | 12/2002 | Catan | 235/375 |
| 6,595,417 B2 * | 7/2003 | O'Hagan et al. | 235/383 |
| 6,598,795 B1 * | 7/2003 | Prenn | 235/462.01 |
| 6,634,814 B2 | 10/2003 | Spurr et al. | |
| 6,677,852 B1 | 1/2004 | Landt | |
| 6,811,079 B1 * | 11/2004 | Vraa et al. | 235/383 |
| 6,820,075 B2 * | 11/2004 | Shanahan et al. | 715/205 |
| 6,854,654 B2 * | 2/2005 | Prenn | 235/462.13 |
| 6,862,103 B1 * | 3/2005 | Miura et al. | 358/1.15 |
| 6,963,351 B2 | 11/2005 | Squires et al. | |

(Continued)

FOREIGN PATENT DOCUMENTS

WO  WO 01/42882 A  6/2001

(Continued)

OTHER PUBLICATIONS ddoc Programmer's Manual v1.9c Label Generation; http://www.greatwebdivide.com/ddoc_manual/labels.htm; pp. 1-2.

(Continued)

*Primary Examiner* — Charlotte M Baker
*Assistant Examiner* — Dennis Dicker
(74) *Attorney, Agent, or Firm* — Avery Dennison Corporation Mentor, Ohio

(57) ABSTRACT

The present invention relates to a system for retrieving a printable media template from an identifier that is associated with printable media. The identifier is retrieved by a reader and a controller that are operatively coupled to receive and process the information. The controller includes a template engine that retrieves a printable media template corresponding to the information received from the identifier. A method for retrieving and generating a printable media template is also provided. A printable media package is also included that identifies a printable template for printing content on the printable media.

44 Claims, 7 Drawing Sheets

U.S. PATENT DOCUMENTS

| | | | |
|---|---|---|---|
| 7,606,741 B2* | 10/2009 | King et al. | 705/27.2 |
| 8,010,515 B2* | 8/2011 | Mirzad et al. | 707/705 |
| 8,150,156 B2* | 4/2012 | Geva et al. | 382/175 |
| 2002/0059880 A1 | 5/2002 | Klinefelter et al. | |
| 2002/0065976 A1 | 5/2002 | Kahn et al. | |
| 2002/0165877 A1* | 11/2002 | Malcolm et al. | 707/507 |
| 2002/0179715 A1* | 12/2002 | Kawai | 235/462.13 |
| 2003/0004946 A1 | 1/2003 | VanDenAvond et al. | |
| 2005/0165784 A1 | 7/2005 | Gomez et al. | |
| 2005/0246738 A1 | 11/2005 | Lockett et al. | |
| 2005/0275708 A1 | 12/2005 | Squires et al. | |
| 2007/0171447 A1 | 7/2007 | Schoedinger et al. | |
| 2009/0287992 A1* | 11/2009 | Bresolin et al. | 715/226 |
| 2011/0271173 A1* | 11/2011 | Ait-Mokhtar et al. | 715/226 |

FOREIGN PATENT DOCUMENTS

| | | |
|---|---|---|
| WO | WO 2005/101192 A | 10/2005 |

OTHER PUBLICATIONS ddoc Programmer's Manual v1.9c Label Generation; http://www.greatwebdivide.com/ddoc_manual/labelfunctions.htm; pp. 1-4.

* cited by examiner

SYSTEMS AND METHODS FOR RETRIEVING PRINTABLE MEDIA TEMPLATES

TECHNICAL FIELD

The present invention relates generally to printable media, and more particularly to systems and methods for retrieving printable media templates.

BACKGROUND

Currently, individuals using printable media (e.g., die cut labels), such as address labels, business cards and other formatted types of printable media, may employ pre-formatted software templates in existing software programs. Printable media can have various configurations, including single sheets of labels that can be printed upon by desktop computer printers. Media in roll form is also available for printing in suitable printers. The software template is typically a text file with embedded codes defining a number of fields that define print information and print location of the print information to be printed on the printable media. The software template allows proper positioning, and optionally formatting, of the print information on the printable media, and facilitates the addition of print information into the various printable fields of the printable media. Typically, a number of software templates can reside in a word processing program, a database program or a specific customized printable media program. Many of these software templates can be retrieved within an associated program from an index or menu having a manufacturer's product code.

If a given software template is not available in the associated program, a user can search the manufacture's website and download the software template for use, or manually create a template via a user interface of the associated program or a template generation program from a set of instructions or media measurements. In addition, some templates are available on the Internet and have the functionality to allow a user to input information into a template and print the information on the selected media without using a word processing program. However, users may have difficulty locating the correct templates, or may sometimes select the incorrect template for the associated media. Even if the correct template is located and selected, the user may have to follow several steps to find and select the correct template, in addition to selecting data to merge with the template or input data into the template for printing. The present invention addresses these shortcomings.

SUMMARY

The present invention is related to systems and methods for readily retrieving a printable media template. In one aspect of the invention and by way of example only, a system is provided that has a reader interface configured to receive an identifier associated with a printable media from a reader, and a controller operatively coupled to receive the identifier from the reader interface. The controller includes a template engine that retrieves a printable media template corresponding to the received identifier.

In another aspect of the invention, a computer readable medium is provided. The computer readable medium includes computer executable components comprising a template engine control configured to receive a printable media identifier read from a reader. The printable media identifier is associated with a printable media. The computer executable components further comprise an application program interface configured to provide a communication interface between a printable media application program and the template engine control for retrieving a printable media template in response to receipt of the printable media identifier by the template engine control.

In yet another aspect of the present invention, a method is provided for retrieving a printable media template. The method comprises receiving a printable media identifier associated with a printable media via a reader device, and automatically retrieving a printable media template in response to the receiving of the printable media identifier.

In yet a further aspect of the invention, a printable media package is provided. The printable media package comprises a printable media and a printable media identifier stored in an electronically readable format and packaged with the printable media. The printable media identifier identifies a printable media template for printing content on the printable media.

DETAILED DESCRIPTION

The present invention relates to systems and methods for retrieving printable media templates to more readily allow the printing of information on the printable media. The systems and methods employ a printable media identifier to retrieve a corresponding printable media template in response to receiving the printable media identifier, for example, from an electronic reader. The printable media template can then be employed to print content on the printable media. The printable media identifier can reside on a variety of different electronically readable formats, such as a bar code, in a stand-alone memory device, a memory device residing on a radio frequency (RF) communication unit, or a radio frequency identification (RFID) tag or transponder. The electronically readable format can be packaged with the printable media and can also include a computer readable medium having computer executable software for retrieving a printable media template in response to receiving a printable media identifier.

The systems and methods can be employed in a variety of implementations, such as in a manufacturer's/distributor's and/or reseller's inventory management or point of sale system. The systems and methods can also be employed to initiate a purchase of replacement products electronically or via telephone for distributors, resellers or end users. The systems and methods can be employed to indicate manufacturing information for quality control and to potentially to advise users or for locating products either by manufacturers, distributors, resellers and/or end users. It is to be appreciated that the present invention can be employed for a variety of other applications that employ printable media templates.

Figure 1:
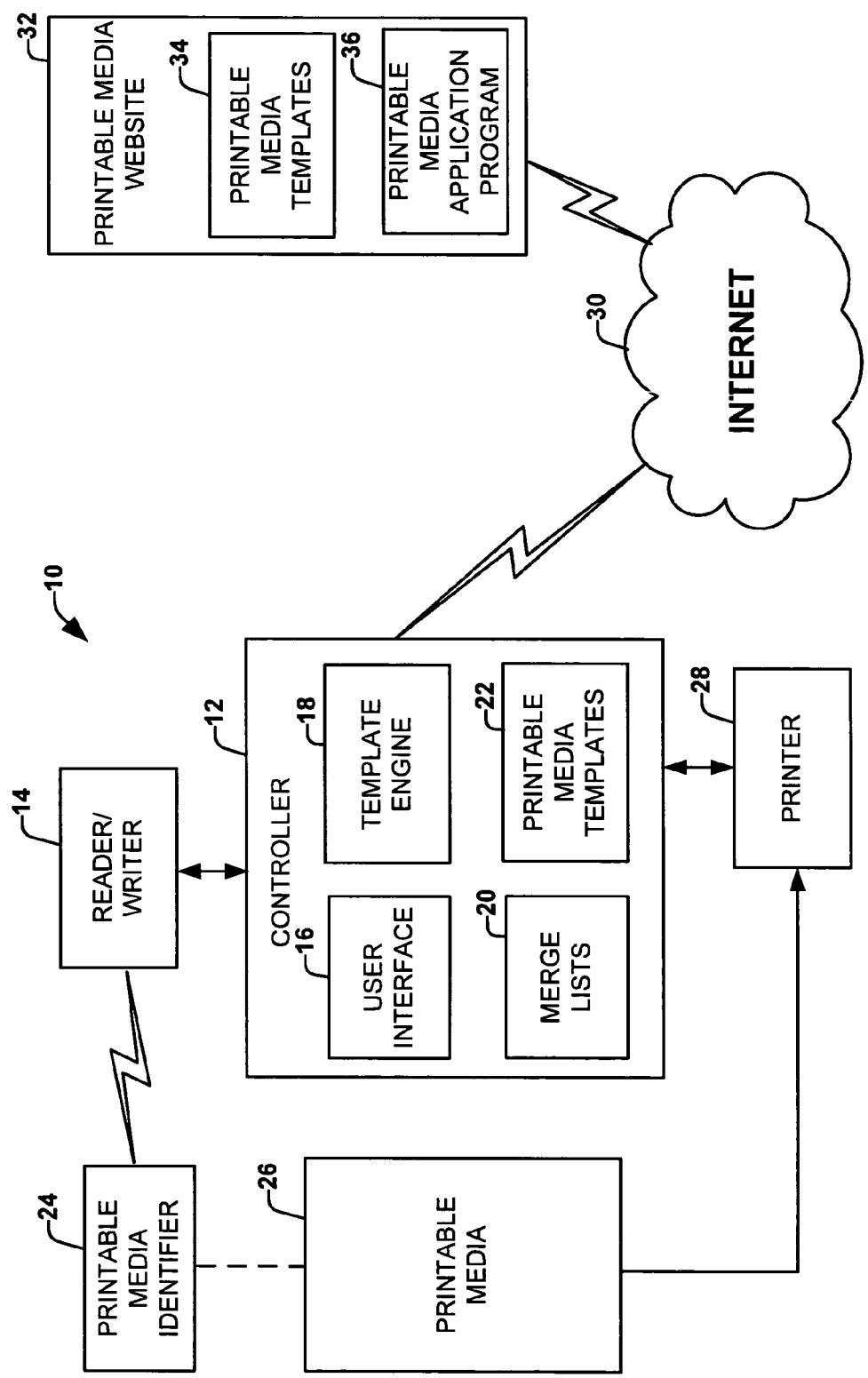
FIG. 1 illustrates a system for retrieving printable media templates in accordance with an aspect of the present invention.

FIG. 1 illustrates a system 10 for retrieving a printable media template in accordance with an aspect of the present invention. The system 10 includes a controller 12 coupled to a reader/writer 14. The reader/writer 14 is configured to read a printable media identifier 24 associated with a printable media 26. The printable media 26 can be in the form of a sheet of printable media, a package of printable media sheets, a roll of printable media or a variety of other forms of printable media. The printable media 26 can include a plurality of die-cut printable media portions distributed over one or more printable media sheets. The printable media sheets can comprise labels, such as address labels, binder labels, burst labels, cartridge labels, filing labels, full sheet labels, identification labels, mailing seals, multi-use labels, neon labels, return address labels, round labels, send & reply labels, shipping labels, and To/From labels. The printable media can also comprise a variety of different formats of binders & report covers, binding supplies, cards, CD labels/electronic media, dividers, card sheets, labels, name badges, photo paper, sheet protectors and printable crafts.

The controller 12 includes a template engine 18, a user interface 16, one or more merge lists 20 and a plurality of printable media templates 22. The controller 12 can execute executable functions and/or components via hardware and/or software. The controller 12 can comprise one or more processors and one or memory devices for execution of software executable components. In one aspect of the invention, the controller 12 is a computer that includes a processor, memory, an operating system, one or more application programs, a universal serial port for communicating with the reader/writer, a printer port for communicating with a printer 28 for printing the printable media, a network card and a network port for communicating with a network, such as the Internet 30.

The template engine 18 is an executable component that can include an algorithm for initiating a read operation by the reader/writer 14 for reading the printable media identifier 24. The read operation can be initiated via a user or periodically executed via a read instruction or read request by the reader/writer 14. The reader/writer 14 can receive a response upon the printable media identifier 24 being within the reading range of the reader/writer 14. The printable media identifier 24 can be a manufacturer's product code. Alternatively, the template engine 18 can employ a look up table or the like that matches the printable media identifier 24 with a manufacturer's product code. The template engine 18 can employ the manufacture product code to retrieve a printable media template associated with the printable media 26. The template engine 18 can retrieve the printable media template and load the printable media template via an application program for display to a user via the user interface 16. The printable media template can be a blank template or a predesigned template from which the user can select and supplement by providing desired information and/or adding to or modifying the graphical content of the template. Alternatively, the template engine can retrieve a plurality of templates that can include a plurality of predesigned templates (e.g., already having formatting and content), and a user can select from the plurality of predesigned templates for printing.

Alternatively, the template engine 18 can populate the printable media template with data via one or more merge lists 20. The data in the merge lists 20 can be predefined, for example, by a user via the user interface 16, and stored prior to reading of the printable media identifier 24. A merge list identifier can be associated with the printable media identifier 24 or the manufacturing product code, such that printable media template and a merge list will automatically be retrieved and the data from the merge list will automatically populate the printable media template in response to a reading of an associated printable media identifier. The merge list identifier can be stored in a memory associated with the controller 12. Alternatively, the merge list identifier can be written to a data storage device associated with the printable media identifier 24 via the controller 12 and the reader/writer 14. The merge list identifier can be stored in a separate field or added to the printable media identifier.

In one aspect of the invention, the printable media identifier 24 will be associated with a website link for accessing a given printable media template from a plurality of printable media templates residing at a printable media website 32. The printable media website can be a manufacturer, distributor or developer of the printable media, printable media templates and/or one or more printable media application programs. The template engine 18 can employ the website link to access a printable media website 32 associated with an identified printable media template in the event that the identified template does not reside in local memory of the controller 12. The template engine 18 can display the printable media website 32 or the page where the identified printable media template resides. Furthermore, the template engine 18 can be configured to automatically download the printable media template via a web browser, execute the application program, and then populate the template via the user interface 16 or automatically the one or more merge lists 20. In yet another aspect of the present invention, the template engine 18 can employ the website link to execute a printable media application program 36 residing at the printable media website 32. The printable media template can be selected by a user, automatically loaded from local memory or from the printable media templates 34 into the printable media application program 36. Additionally, the printable media application program 36 can be downloaded from the printable media website 32 and executed locally.

In one aspect of the invention, the printable media identifier 24 can be in the form of a bar code (e.g., one-dimensional bar code, two dimensional bar code) that resides on the printable media 26, on a portion of a printable media sheet or on a package or roll associated with the printable media 26. The reader/writer 14 can be a bar code scanner that reads one-dimensional or two-dimensional bar code associated with the printable media identifier 24 and provides the printable media identifier 24 to the controller 12. The reader/writer 14 can also include a bar code printer for printing a printable media identifier, or for printing a merge list identifier, such that the user can scan both the printable media identifier 24 and the merge list identifier for automatic retrieval of the printable media template and automatic population of the printable media template via one or more merge lists 20.

In another aspect of the invention, the printable media identifier 24 can reside in a data storage device, for example, a physical memory stick, SecureDigital (SD) Multimedia card, an ExtremeDigital (XD) Multimedia card, a compact Flash Card, a MemoryStick (MS), or a SmartMedia (SM) or other removable storage device (e.g., a microdrive). The data storage device can be provided with the printable media 26 and the reader/writer 14 can have a recess configured for receiving the data storage device for reading from and writing to the data storage device.

In another aspect of the invention, the printable media identifier 24 can reside in a data storage device of a wireless communication unit. For example, the wireless communication unit can include control logic, a memory and a transceiver device for transmitting and receiving wireless communication with the reader/writer 14. The wireless communication and the reader/writer 14 can be configured to transmit communication via Wireless Fidelity (Wi-Fi) or IEEE 802.11, Bluetooth, IEEE 802.16, Third Generation (3G) wireless or some other wireless communication protocol. Alternatively, the printable media identifier 24 can reside in a data storage device of a radio frequency identification (RFID) tag. The RFID tag can be an active tag or a passive tag. The RFID tag can reside on a package of printable media sheets, on a roll of printable media (e.g., on a roll core), or on individual printable media sheets. The RFID tag can be programmable, such that the RFID tag can be programmed with a printable media identifier, a merge list identifier, a website link, a RFID number and/or a variety of other information. The reader/writer 14 can be configured to periodically generate a read request and receive a response that includes the printable media identifier 24 upon an RFID tag being brought into reading range of the reader/writer 14.

It is to be appreciated that the template engine 18 can be employed to program a blank stand-alone memory device or memory device that resides on a RF device, or generate a bar code label via the reader/writer 14 by a user via the user interface 16. Therefore, the printable media identifier, merge list identifier and associated printable media website can be programmed by the user on-site in the event a printable media identifier is not associated with a given printable media.

Figure 2:
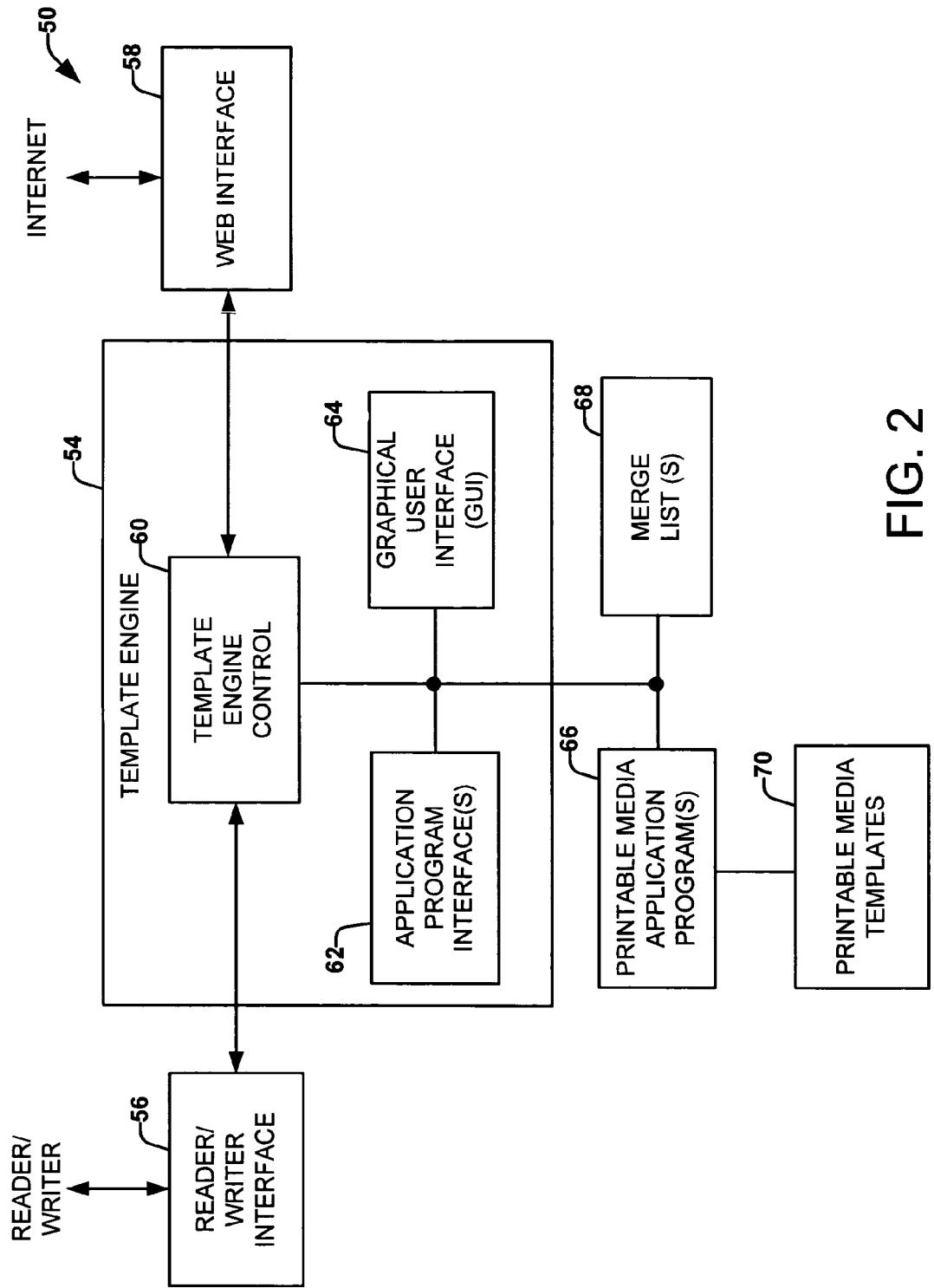
FIG. 2 illustrates exemplary software components for retrieving printable media templates in accordance with an aspect of the present invention.

FIG. 2 illustrates a system 50 having exemplary software components for retrieving printable media templates in accordance with an aspect of the present invention. The exemplary software components can execute on a computer and include a template engine 54 that includes a template engine control 60, one or more application program interfaces (APIs) 62 and a graphical user interface (GUI) 64. The template engine control 60 includes executable instructions for interfacing with a reader/writer interface 56, a web interface 58, the one or more APIs 62 and the GUI 64. The reader/writer interface 56 can include software drivers and hardware drivers (e.g., I/O port drivers) for receiving and writing information via a reader/writer device (not shown). The web interface 58 can include software drivers and hardware drivers (e.g., network card/drivers) for interfacing with a network, such as the Internet.

The template engine control 60 employs the one or more APIs 62 to communicate with one or more printable media application program 66, and to provide instructions to retrieve a printable media template from a set of printable media templates 70 associated with the one or more printable media application programs 66. The instructions could include instructions to execute a selected printable media application program, instructions to retrieve a desired printable media template associated with a manufacturer's product code provided by the template engine control 60 via an associated printable media identifier received through the reader/writer interface 56. Optionally, a merge list identifier can be provided by the template engine control 60 via an associated merge list identifier received through the reader/writer interface 56 or local memory or retrieving a given merge list from a plurality of merge lists 68, and populating the retrieved printable media template with data from the identified merge list.

The APIs 62 can also provide an indication to the template engine control 60 if an identified printable media template does not reside locally in the set of printable media templates 70. The template engine control 60 can then employ a printable media website via a website identifier, such as a Universal Resource Locator (URL) to retrieve the identified printable media template. The website identifier can be provided from the reader/writer interface along with the printable media identifier, or can be determined based on the printable media identifier, for example, through a look up table. The website identifier can be a URL link that points to a printable media website or directly to a desired printable media template on a printable media website (not shown). The template engine control 60 can be configured to automatically download the desired printable media template based on the printable media identifier, execute the printable media application program 66 and load the downloaded printable media template into the printable media application program 66. Additionally, the template engine control 60 can be configured to execute a printable media application program residing at the printable media website or download the printable media application program, and load the desired printable media template into the website printable media application program from instructions received by the template engine control 60.

The GUI 64 can allow a user to build merge lists for populating printable media templates. Alternatively, a user can build merge lists through the one more printable media application program 66. The GUI 64 can also allow a user to write information for associating with the printable media identifier, such as a merge list identifier, execution instructions or other useful information that a user desires to associate with a printable media identifier. The information can be provided in the form of a bar code label, or data that is written to memory of a memory device in which the printable media identifier is stored. The GUI 64 provides the desired information to the template engine control 60, which cooperates with the reader/writer interface 56 and reader/writer to associate the desired information with a respective printable media identifier.

The GUI 64 can provide a menu for selecting a merge list and an associated merge list identifier that can then be written to an electronic readable medium. The GUI can also provide a menu or selection list that allows a user to select a desired printable media application program to work from either residing locally or remotely, and associate a printable media application program identifier with the selected printable media application program. The GUI 64 can include other menus for writing instructions to a memory device in which the printable media identifier is stored, such as directing the template engine control to execute a printable media application program residing at the printable media website and load a desired printable media template into the printable media application program. Alternatively, the instructions could direct execution of a local selected printable media application program, load a local or remote printable media template based on the printable media identifier and website identifier, automatically populate the printable media template with data from a merge list based on a merge list identifier, and automatically display and/or print the printable media with the populated data to the printable media.

Other information can be provided and written to the storage device associated with the printable media identifier or local memory and employed at runtime, such as other possible content and design elements, automatic loading of personal information from local databases or application, tips, suggestions and/or information on related products and services. It is appreciated that a variety of instruction and information can be provided and written to a data storage device associated with a printable media identifier, or stored locally and employed at runtime based on a printable media identifier.

Figure 3:
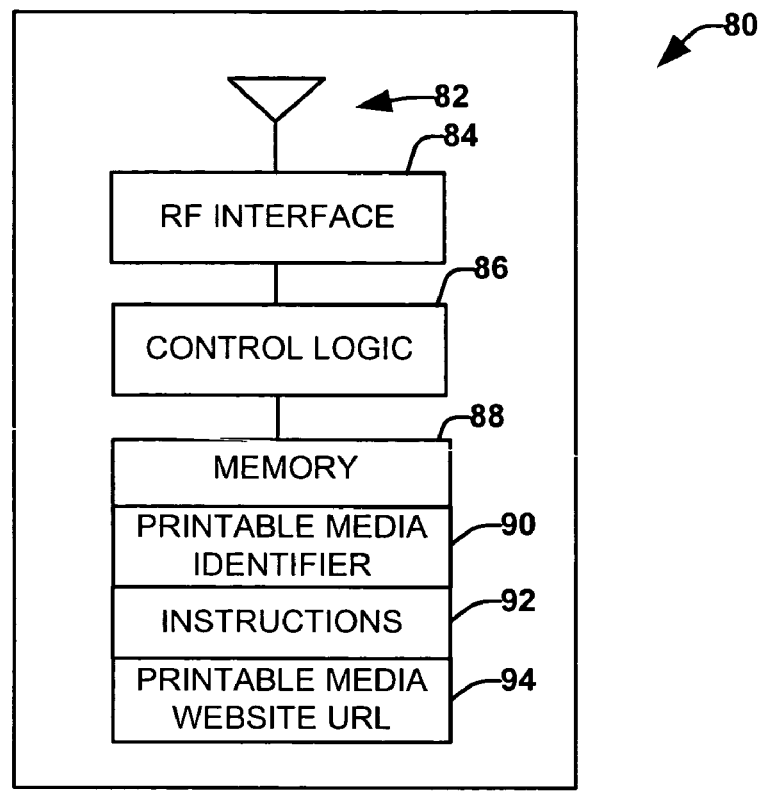
FIG. 3 illustrates a block schematic diagram of a radio frequency (RF) device for storing a printable media identifier in accordance with an aspect of the present invention.

FIG. 3 illustrates a radio frequency (RF) device 80 for storing a printable media identifier in accordance with an aspect of the present invention. The RF device 80 can be a wireless device that conforms to Wi-Fi, Bluetooth, 802.16, 3G or some other wireless communication protocol. The RF device 80 can be an RFID tag in the form of a die-cut printable media, such as a RFID label that can be adhesively bonded to a printable media sheet, printable media roll or a package of printable media sheets. The RF device 80 includes an antenna 82 coupled to an RF interface 84. The RF interface 84 can include transceiver circuitry, such as amplifiers, filters and switches. The RF interface 84 can be coupled to control logic 86. The control logic 86 can be configured to receive read and write instructions through the antenna 82 and the RF interface 84, from a wireless transmission device, such as a wireless reader/writer. The control logic 86 can read and write information from and to a memory device 88. The memory device 88 can include, for example, a printable media identifier 90, instructions 92 associated with the printable media identifier 90 and a printable media website URL 94 associated with the printable media identifier 90. The instructions 92 can include information related to execution of a printable media application program residing at the printable media website and loading of a printable media template associated with the printable media identifier 90. As discussed above with respect to FIG. 2, the instructions can include a variety of instructions and/or information that can be employed at runtime.

Figure 4:
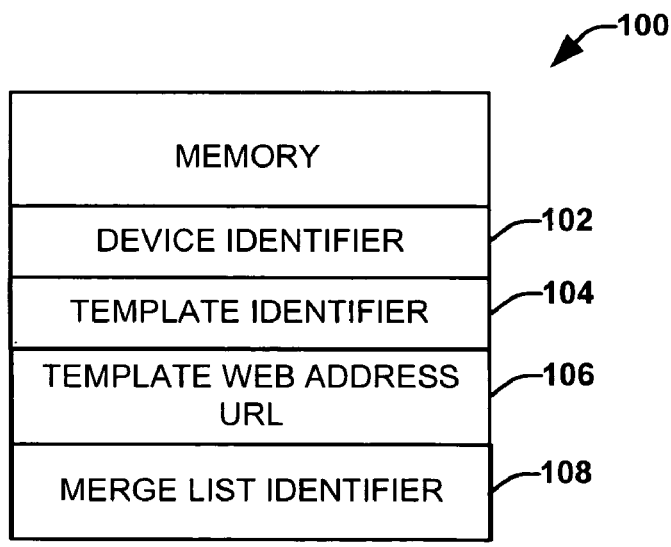
FIG. 4 illustrates a block schematic diagram of a memory device for storing a printable media identifier in accordance with an aspect of the present invention.

FIG. 4 illustrates a block schematic diagram of a memory device 100 for storing a printable media identifier in accordance with an aspect of the present invention. The memory device 100 can reside in an RF device as described in FIG. 3. Additionally, the memory device 100 can be a stand-alone memory chip, such as SD Multimedia card, an XD Multimedia card, a compact Flash Card, a MemoryStick, or a SmartMedia or other removable storage device. The memory device 100 can be provided with a roll of printable media or a package of printable media sheets. The memory device 100 can be inserted into a memory device reader/writer for reading and writing information from and to the memory device 100. The memory device 100 can include a device identifier field 102 that identifies the memory device 100, a template identifier field 104 that identifies the printable media template to be retrieved, a template web address field 106 for automatic access of the printable media template if it is not found in local memory, and a merge list identifier field 108 that identifies a merge list that can be employed to populate the retrieved printable media template. The device identifier field 102, the template identifier field 104 and the template web address URL field 106 can be preprogrammed at the manufacturer and the merge list identifier 108 programmed by a user. Alternatively, each of the fields can be programmed by the user, such that a blank memory device can be programmed by the user and associated with a given printable media.

Figure 5:
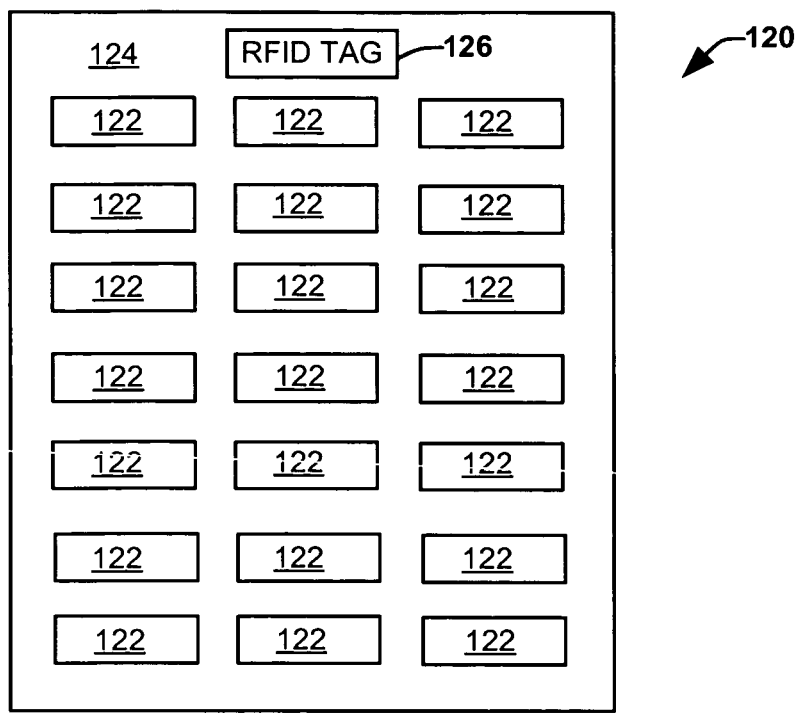
FIG. 5 illustrates a printable media label sheet having a radio frequency identification (RFID) tag for storing a printable media identifier in accordance with an aspect of the present invention.

FIG. 5 illustrates an embodiment of a printable media sheet 120 in accordance with an aspect of the present invention. The printable media sheet 100 has a plurality of uniformly spaced apart labels 122 releasably adhered to a carrier sheet 124. The printable media sheet 120 also includes an RFID tag label 126 for storing a printable media identifier associated with the printable media sheet 120. The RFID tag label 126 can be permanently or releasably adhered to the printable media sheet 120. The RFID tag label 126 can be programmed with an RFID identifier, a printable media identifier, a printable media website address and/or a website template address for automatic downloading of a printable media template and other useful information. The RFID tag label 126 can be programmed at the manufacturer, or be programmed by a user on-site. Additionally, the user can program the RFID tag label 126 with a merge list identifier, and other useful information employing an RFID tag reader/writer. The RFID tag label 126 can be active or passive and be configured to provide memory information in response to read requests from the RFID tag reader/writer.

Figure 6:
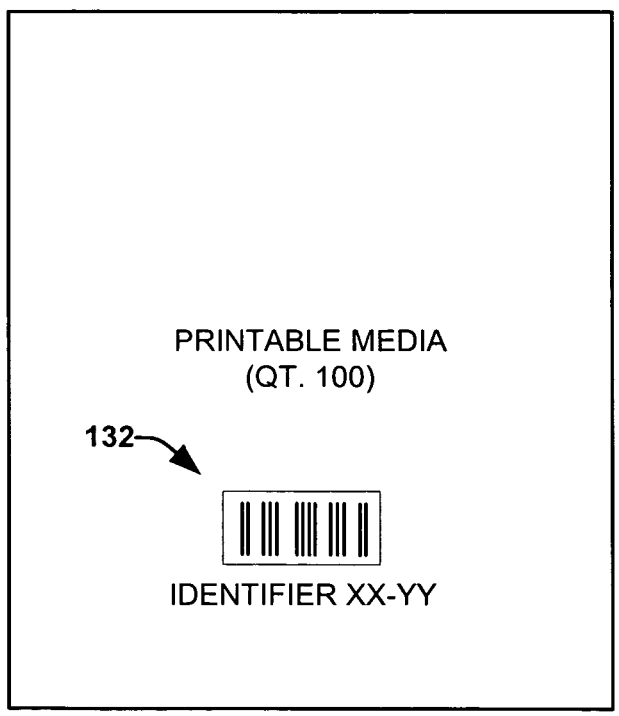
FIG. 6 illustrates a package of printable media having a bar code for storing a printable media identifier in accordance with an aspect of the present invention.

FIG. 6 illustrates a package of printable media 130 having a bar code 132 for storing a printable media identifier in accordance with an aspect of the present invention. The package of printable media 130 includes a quantity of 100 sheets of printable media. The bar code 132 includes encoded information (e.g., Universal Product Code (UPC)) that includes a printable media identifier. The printable media identifier can be read by a bar code reader and automatically uploaded to a computer for retrieval of an associated printable media template. A user can employ a bar code writer and a printable media writer to generate a bar code associated with a merge list identifier to be added to the package of printable media 130 via a pressure sensitive adhesive or the like. A user can then scan in the bar code 132 and an associated printable media identifier for retrieval of a printable media template, and scan in a bar code and an associated merge list identifier for automatically populating the printable media template with data from an associated merge list.

Figure 7:
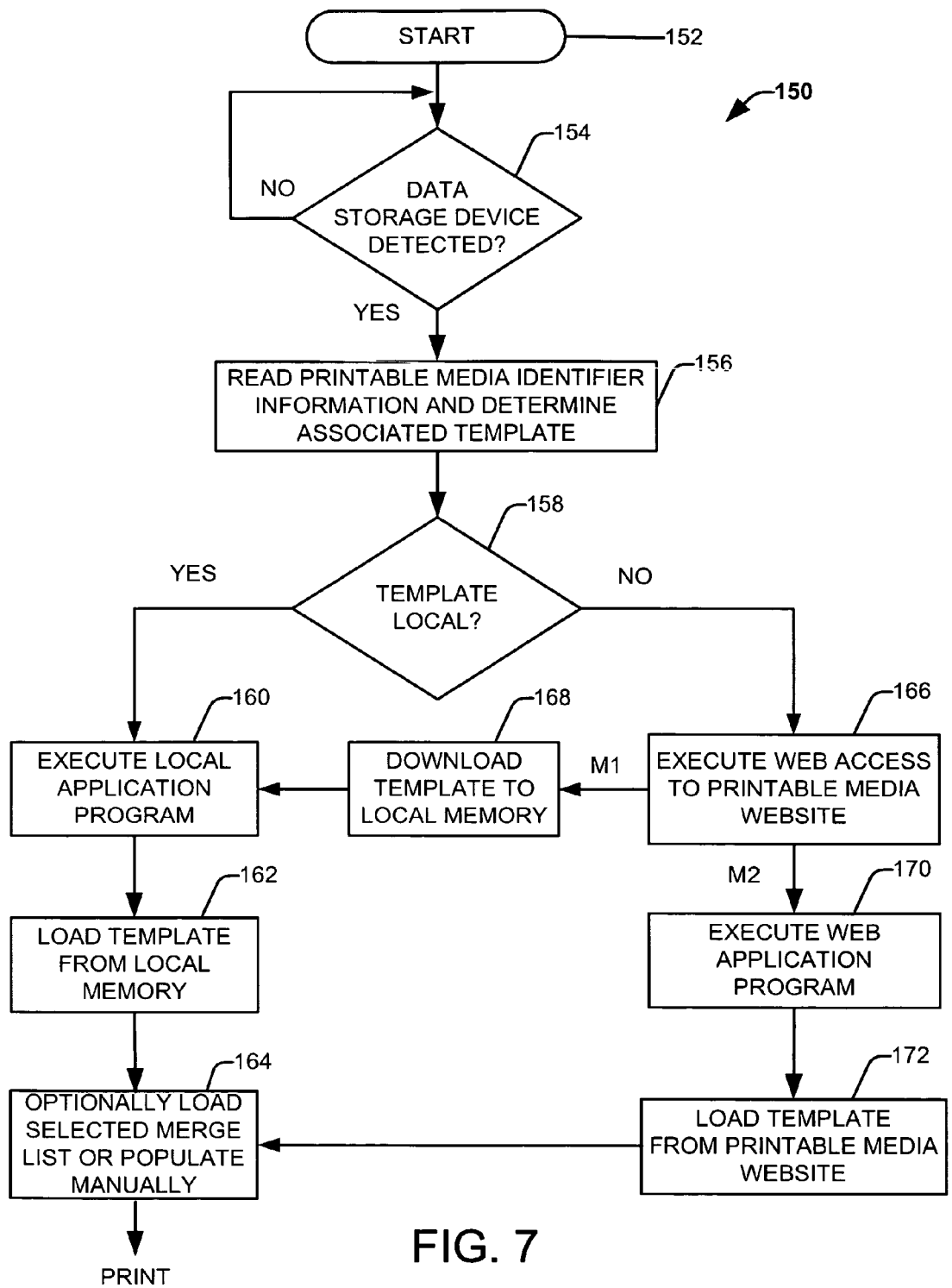
FIG. 7 illustrates a methodology for retrieving a printable media template in accordance with an aspect of the present invention.
Figure 8:
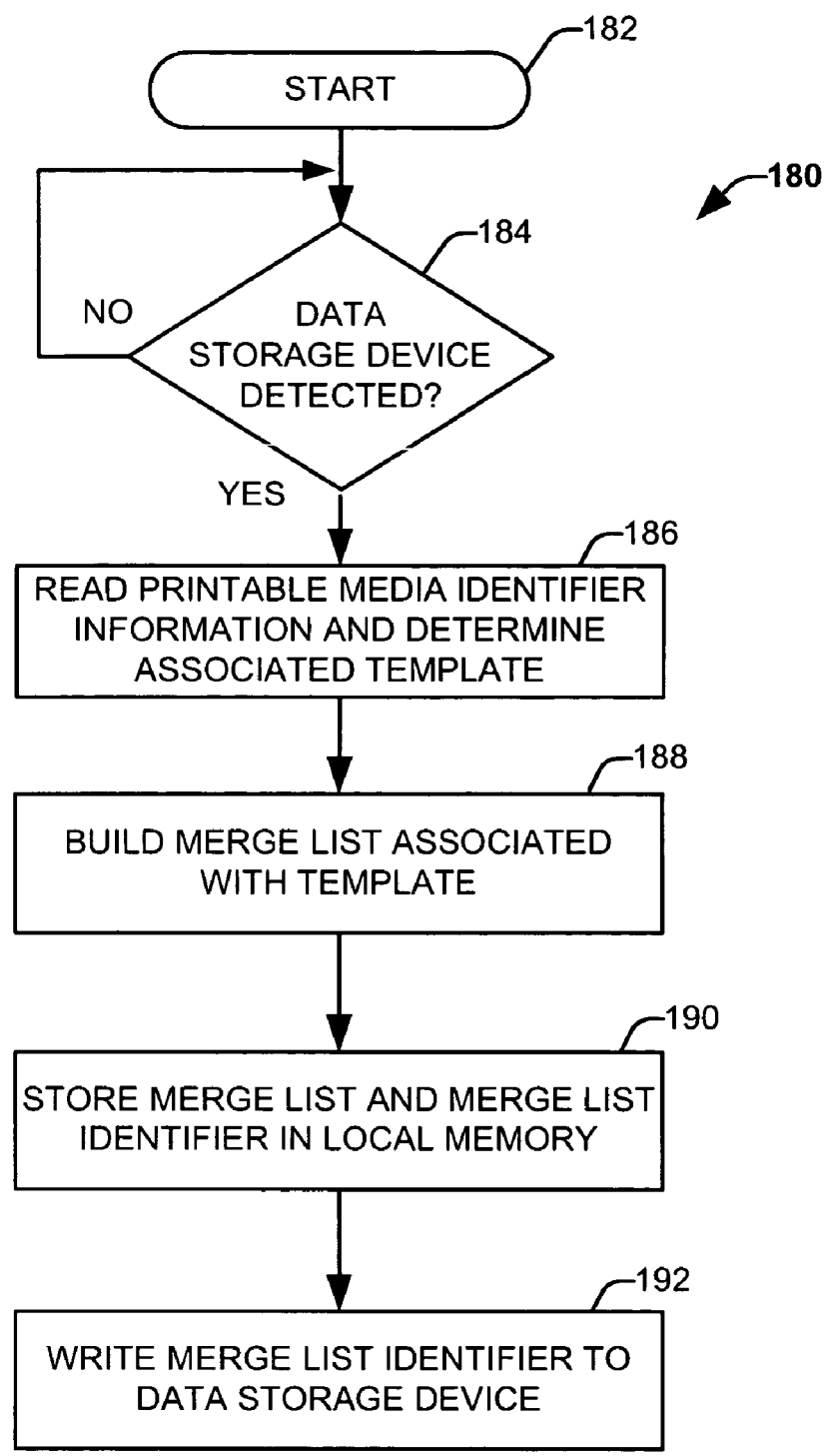
FIG. 8 illustrates a methodology for providing a merge list identifier to a memory device that contains an associated printable media identifier in accordance with an aspect of the present invention.

In view of the foregoing structural and functional features described above, methodologies will be better appreciated with reference to FIGS. 7-8. It is to be understood and appreciated that the illustrated actions, in other embodiments, may occur in different orders and/or concurrently with other actions. Moreover, not all illustrated features may be required to implement a method.

FIG. 7 illustrates a methodology 150 for retrieving a printable media template in accordance with an aspect of the present invention. The methodology starts at 152 and proceeds to determine if a data storage device is detected at 154. If a data storage device is not detected (NO), the methodology continues to determine if a data storage device is detected. If a data storage device is detected (YES), the methodology proceeds to 156. At 156, printable media identifier information is read and an associated printable media template is identified. The printable media identifier information can include a printable media identifier, a printable media website address, a device identifier, a template identifier, a template web address, a merge list identifier, instructions and other associated printable media identifier information. The methodology then proceeds to 158.

At 158, the methodology determines if the identified template resides locally. If the identified template resides locally (YES), the methodology proceeds to 160. At 160, a local printable media application program is executed. At 162, the identified template is loaded from local memory into the local printable media application program. At 164, optionally a merge list is selected and data from the merge list employed to populate the identified printable media template or the printable media template can be populated manually. This merge list can be selected by a user or automatically selected based on a merge list identifier that is read from the data storage device. The printable media can be loaded into a printer and the populated printable media template selected for printing on the printable media. Alternatively, the populated printable media template can automatically print based on instructions in the printable media identifier information.

If the identified template does not reside locally (NO) at 158, the methodology proceeds to 166. At 166, the methodology executes web access to a printable media website. If a first mode (M1) is selected at 166, the identified template is downloaded from the printable media website to local memory via manually or automatically based on provided instructions and a direct link to the identified template. The methodology can then proceed to execute the local printable media application program at 160, load the template from local memory at 162 and optionally populate the identified template with data from a merge list or manually enter data into the identified template at 164. If a second mode (M2) is selected at 166, a web printable media application program is executed at 170. The web printable media application program can be executed at the printable media website or downloaded and executed locally. At 172, an identified template is loaded into the web printable application program from the printable media website. The methodology can then proceed to 164 to optionally populate the identified template with data from a merge list or manually populate data into the identified template. The mode can be selected based on instructions or information associated with the printable media identifier, or whether or not a local printable media application program is available.

FIG. 8 illustrates a methodology 180 for transmitting a merge list identifier in a memory device that contains an associated printable media identifier in accordance with an aspect of the present invention. The methodology starts at 182 and proceeds to determine if a data storage device is detected at 184. If a data storage device is not detected (NO), the methodology continues to determine if a data storage device is detected. If a data storage device is detected (YES), the methodology proceeds to 186. At 186, printable media identifier information is read and an associated printable media template is identified. The printable media identifier information can include a printable media identifier, a printable media website address, a device identifier, a template identifier, a template web address, instructions and other associated printable media identifier information. The methodology then proceeds to 188.

At 188, a merge list is built associated with the identified template. At 190, the merge list is stored with an assigned merge list identifier in local memory. At 192, the merge list identifier is written to the data storage device via a reader/writer. The data storage device can then be employed whenever a user desires to print with the above discussed printable media that is populated with the associated merge list. A reader/writer will read the printable media or template identifier and associated merge list identifier. A controller or computer will receive the printable media or template identifier and associated merge list identifier, automatically retrieve the printable media template associated with the printable media or template identifier, and automatically populate the printable media template with data associated with a merge list corresponding to the merge list identifier.

Figure 9:
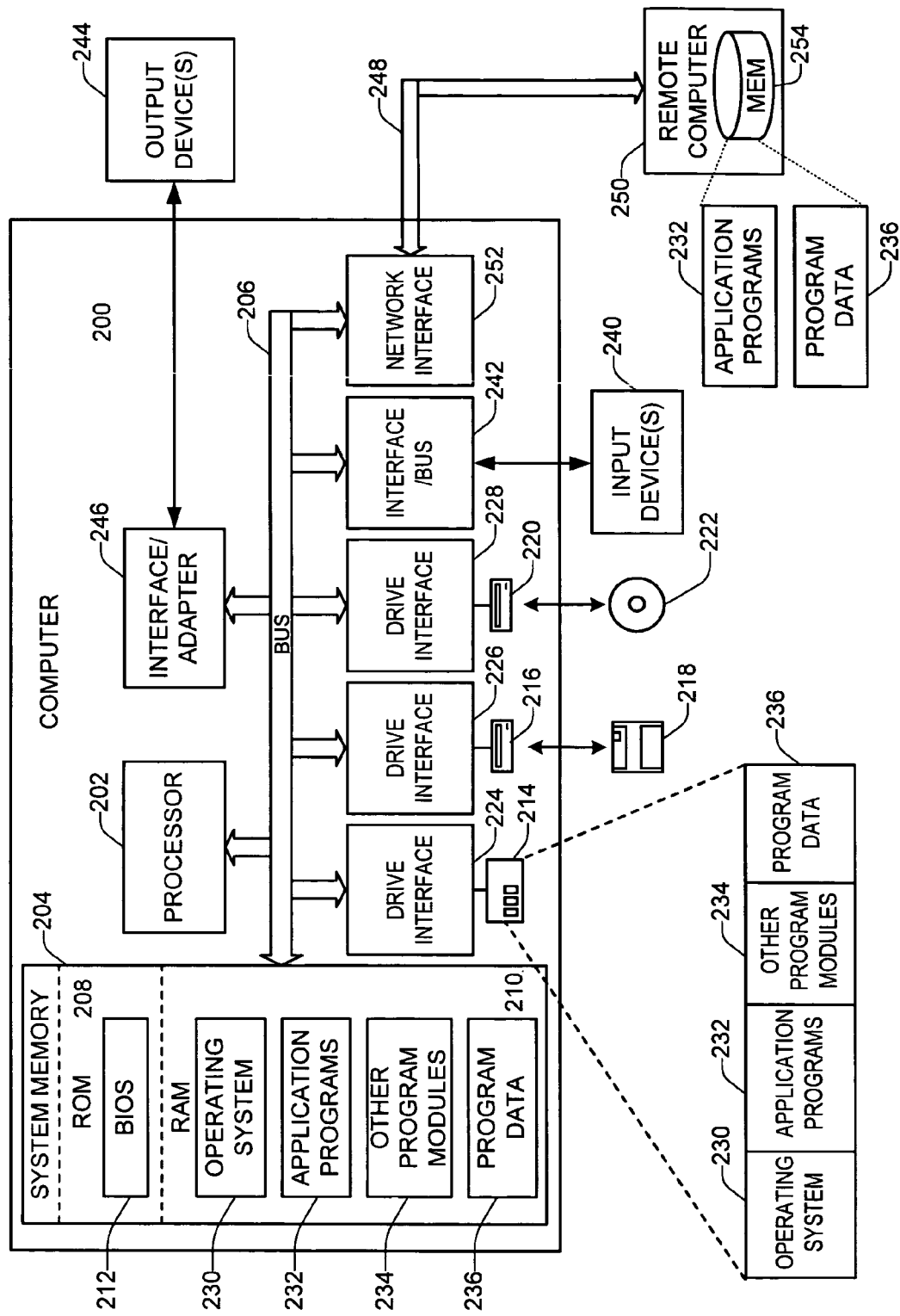
FIG. 9 illustrates an embodiment of a computer system.

FIG. 9 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236. The one or more application programs can include the components and functionality of the systems and methods described in FIGS. 1-8.

A user may enter commands and information into the computer system 200 through user input device 240, such as a keyboard, a pointing device (e.g., a mouse). Other input devices may include a microphone, a joystick, a game pad, a scanner, a touch screen, a reader/writer or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for retrieving a printable media template, the system comprising:
a controller including a processor, memory, an operating system, and one or more application programs;
a package containing a quantity of printable media and a print media identifier having pre-formatted media templates and a merge list identifier associated with the print media identifier;
a reader interface configured to receive information from the identifier associated with the printable media from a reader;
the controller operatively coupled to a reader to receive the identifier from the reader interface, the controller including a template engine that retrieves one of a printable media template corresponding to the received identifier to create a printed media to populate the printable media template with data via one or more merge lists wherein the one or more merge lists are within the controller;
a user interface within the controller; and
wherein the user interface is capable of programming a second printable media identifier associated with a second merge list identifier.

2. The system of claim 1, wherein the template engine executes a printable media application program and loads the retrieved printable media template into the printable media application program in response to the received identifier.

3. The system of claim 2, wherein the template engine automatically populates the retrieved printable media template with data associated with a merge list.

4. The system of claim 3, wherein the template engine retrieves the merge list based on a merge list identifier read by the reader.

5. The system of claim 1, wherein the template engine periodically initiates a read operation by the reader interface to determine if the identifier is in a read range.

6. The system of claim 1, wherein the template engine employs a uniform resource locator (URL) to retrieve the printable media template from a printable media website.

7. The system of claim 6, wherein the template engine downloads the printable media template from the printable media website, executes a printable media application program and loads the retrieved printable media template into the printable media application program in response to the received identifier.

8. The system of claim 7, wherein the template engine downloads the printable media application program from the printable media website and loads the retrieved printable media template into the printable media application program in response to the received identifier.

9. The system of claim 6, wherein the template engine employs one or more uniform resource locators (URLs) to execute a printable media application program at the printable media website and load a retrieved printable media template into the printable media application program in response to the received identifier.

10. The system of claim 1, further comprising a writer coupled to the controller, wherein the controller and writer are configured to write information associated with the printable media and the identifier to one of a bar code label, a stand-alone data storage device, a memory device residing on a RF communication unit and a radio frequency identification (RFID) tag.

11. The system of claim 10, wherein the written information associated with the printable media and the identifier comprises at least one of the identifier, a merge list identifier, a printable media website uniform resource locator (URL), a template URL, a device identifier, a printable media application program identifier, and instructions for performing operations associated with the identifier.

12. The system of claim 1, wherein the identifier resides in memory of a radio frequency identification (RFID) tag label located on the package of printable media.

13. The system of claim 1, wherein the identifier resides in memory of a radio frequency identification (RFID) tag label located on the printable media.

14. The system of claim 1, wherein the printable media is one of a variety of different formats of binders, report covers, binding supplies, cards, compact disk/electronic media labels, dividers, card sheets, sheet labels, roll labels, name badges, photo paper, sheet protectors and printable crafts.

15. A non-transitory computer readable medium having computer executable components comprising:
a controller including a processor, memory, an operating system, and one or more application programs;
a package containing printable media identifier and a printable media;
a template engine control configured to receive the printable media identifier read from a reader, the printable media identifier being associated with the printable media to populate the printable media with data via one or more merge lists wherein the one or more merge lists are within the controller, the print media identifier further associated with a merge list identifier;
an application program interface configured to provide a communication interface between a printable media application program and the template engine control for retrieving a printable media template based in response to receipt of the printable media identifier by the template engine control to create printed media;
a user interface within the controller; and
wherein the user interface is capable of programming a second printable media identifier associated with a second merge list identifier.

16. The computer executable components of claim 15, further comprising a plurality of application program interfaces associated with respective printable media application programs wherein the template engine control provides instructions to a selected application program interface to execute a preselected printable media application program and retrieve a printable media template based on the printable media identifier read from the reader.

17. The computer executable components of claim 16, wherein the preselected printable media application program is preselected based on a printable media application program identifier read from one of a reader and a local memory.

18. The computer executable components of claim 15, wherein the template engine control provides instructions to the application program interface to populate the retrieved printable media template with data associated with a merge list based on a merge list identifier read by the reader.

19. The computer executable components of claim 15, wherein the user interface is configured to provide a menu for associating a preselected printable media application program with a printable media identifier.

20. The computer executable components of claim 15 wherein the user interface is configured to receive inputs and cooperate with the template engine control, a writer interface and an associated writer for writing to a data storage device containing the printable media identifier.

21. The computer executable components of claim 20, wherein the data storage device is one of a stand-alone memory device, a memory device residing on a RF communication unit and a radio frequency identification (RFID) tag.

22. The computer executable components of claim 20, wherein the inputs comprise at least one of the printable media identifier, a merge list identifier, a printable media website uniform resource locator (URL), a template URL, a device identifier, a printable media application program identifier, and instructions for performing operations associated with the printable media identifier.

23. The computer executable components of claim 15, wherein the template engine control employs a uniform resource locator (URL) associated with the printable media identifier to retrieve the printable media template from a printable media website via a web interface.

24. The computer executable components of claim 23, wherein the template engine control downloads the printable media template from the printable media website, executes a printable media application program and loads the retrieved printable media template into the printable media application program in response to the received printable media identifier.

25. The computer executable components of claim 24, wherein the template engine control downloads the printable media application program from the printable media website and loads the retrieved printable media template into the printable media application program in response to the received printable media identifier.

26. The computer executable components of claim 23, wherein the template engine control employs one or more uniform resource locators (URLs) to execute a printable media application program at the printable media website and load a retrieved printable media template into the printable media application program in response to the received printable media identifier.

27. A method for retrieving a printable media template, the method comprising:
providing a system for retrieving a printable media template, the system including a controller coupled to a reader, the controller including a processor, memory, an operating system, and one or more application programs for execution of software executable components, and a user interface with the controller;
supplying printable media in a package;
receiving a printable media identifier associated with the printable media in the package via the reader device coupled to the controller;
retrieving a printable media template in response to the receiving of the printable media identifier;
using the printable media template to print the printable media: and
populating the printable media with data via one or more merge lists wherein the one or more merge lists are within the controller and through a merge list identifier provided with the print media identifier.

28. The method of claim 27, further comprising executing a printable media application program and loading the retrieved printable media template into the printable media application program in response to the receiving of the printable media identifier.

29. The method of claim 28, further comprising automatically selecting the printable media application program based on a printable media application program identifier.

30. The method of claim 28, further comprising automatically populating the retrieved printable media template with data associated with a merge list based on a merge list identifier received by the reader substantially concurrently with the printable media identifier.

31. The method of claim 27, further comprising initiating a read operation by the reader device in response to detection of a printable media identifier in a read range of the reader device.

32. The method of claim 27, wherein the automatically retrieving a printable media template in response to the receiving of the printable media identifier comprises automatically downloading the printable media template from a printable media website in response to a received universal resource locator (URL) from the reader device received substantially concurrently with the printable media identifier.

33. The method of claim 32, further comprising downloading a printable media application program from the printable media website, executing the printable media application program and loading the retrieved printable media template into the printable media application program in response to the received printable media identifier.

34. The method of claim 27, further comprising executing a printable media application program at a printable media website and loading the retrieved printable media template into the printable media application program in response to receiving of the printable media identifier.

35. The method of claim 27, further comprising writing information associated with the printable media and the printable media identifier to one of a bar code label, a data storage device, a memory device residing on a RF communication unit and a radio frequency identification (RFID) tag.

36. The method of claim 35, wherein the written information associated with the printable media and the printable media identifier comprises at least one of the printable media identifier, a merge list identifier, a printable media uniform resource locator (URL), a template URL, a device identifier, a printable media application program identifier, and instructions for performing operations associated with the identifier.

37. The method of claim 27, wherein the printable media identifier resides in memory of a radio frequency identification (RFID) tag label located on one of the printable media and a package of printable media.

38. The method of claim 27, wherein the printable media is one of a variety of different formats of binders, report covers, binding supplies, cards, compact disk/electronic media labels, dividers, card sheets, sheet labels, roll labels, name badges, photo paper, sheet protectors and printable crafts.

39. A printable media package comprising:
a package;
a printable media provided in the package;
a printable media identifier stored in an electronically readable format and packaged with the printable media in the package, the printable media identifier including a printable media template for printing content on the printable media with data via one or more merge lists identified by a merge list identifier associated with the printable media identifier, wherein the one or more merge lists are within a controller having one or more processors and one or more memory devices for execution of software executable components, a user interface within the controller; and wherein the user interface is capable of programming a second printable media identifier associated with a second merge list identifier.

40. The printable media package of claim 39, wherein the printable media is one of a printable media sheet and a roll of printable media.

41. The printable media package of claim 39, wherein the printable media identifier resides in memory of a radio frequency identification (RFID) tag label located on one of the printable media and the printable media package.

42. The printable media package of claim 39, wherein the printable media is one of a variety of different formats of binders, report covers, binding supplies, cards, compact disk/electronic media labels, dividers, card sheets, sheet labels, roll labels, name badges, photo paper, sheet protectors and printable crafts.

43. The printable media package of claim 39, wherein the electronically readable format comprises one of a bar code, a stand-alone memory device, a memory device residing on a RF communication unit and a radio frequency identification (RFID) tag.

44. The printable media package of claim 39, further comprising a computer readable medium having computer executable software for automatically retrieving a printable media template in response to receiving a printable media identifier read from a reader.

* * * * *